US005355157A

United States Patent [19]

Yoshino

[11] Patent Number: 5,355,157

[45] Date of Patent: Oct. 11, 1994

[54] PLOTTER WITH PENCIL-LEAD DETECTING SYSTEM

[75] Inventor: Hiroshi Yoshino, Tokyo, Japan

[73] Assignee: Mutoh Industries, Ltd., Tokyo, Japan

[21] Appl. No.: 988,270

[22] Filed: Dec. 14, 1992

[30] Foreign Application Priority Data

Dec. 25, 1991 [JP] Japan .................................. 3-356941
Apr. 7, 1992 [JP] Japan .................................. 4-113930

[51] Int. Cl.[5] ........................ G01D 15/16; B43L 13/00
[52] U.S. Cl. .................................. 346/139 R; 33/18.1
[58] Field of Search ...................... 346/139 R; 33/18.1, 33/18.2; 395/103

[56] References Cited

FOREIGN PATENT DOCUMENTS 3-108597 5/1991 Japan ............................ B43L 13/00

*Primary Examiner*—Benjamin R. Fuller
*Assistant Examiner*—Alrick Bobb
*Attorney, Agent, or Firm*—Lowe, Price, LeBlanc & Becker

[57] ABSTRACT

A preliminary sensor read unit (83A) performs preliminary sensor read for a movable ring (38) by using a sensor (29) with a pencil (20) set in an upper position. After the preliminary sensor read, a knock control unit (83B) performs a single lead-knocking operation for the pencil. After the lead-knocking operation, a determining sensor read unit (83C) performs determining sensor read for the movable ring by using the sensor, with the pencil set in the upper position. Using a determining threshold prepared on the basis of a sensor value obtained by the preliminary sensor read, a determining unit (83D) discriminates a difference between a sensor value of the determining sensor read and the sensor value of the preliminary sensor read and determines whether or not the length of the lead held by the movable ring has an effective value for plotting.

12 Claims, 10 Drawing Sheets

PLOTTER WITH PENCIL-LEAD DETECTING SYSTEM

BACKGROUND OF THE INVENTION

1. Field of the Invention

The present invention relates to a plotter using a knock-type pencil containing pencil-leads, and more particularly to a plotter with a system for sensing, by means of a reflection-type photosensor, a projection amount, from a pencil case, of a movable ring which holds a pencil-lead and is axially movable, thereby determining whether or not the length of the lead held by the movable ring exceeds an effective value for plotting (i.e. determining the "remaining/lacking" state of a pencil-lead).

2. Description the Related Art

With an X-Y plotter, a pencil for plotting is moved on the basis of plotting data output from a computer, thereby successively performing plotting. The pencil is, for example, a knock-type pencil containing a plurality of pencil-leads. One of the pencil-leads is successively fed, while the pencil is used. Thus, the pencil case includes a movable ring and a chuck mechanism for feeding the pencil lead.

The movable ring has a rubber tube for slidably holding the pencil-lead at its center. The movable ring is urged by a spring in such a direction as to move away from the chuck mechanism. The chuck mechanism holds and releases the lead fed from a knock mechanism. When the movable ring moves away from the chuck mechanism by virtue of the resiliency of the spring in the release mode of the chuck mechanism, the lead is fed from the chuck mechanism in accordance with the motion of the movable ring ("lead-feeding").

While the chuck mechanism holds the lead, the lead is not fed even if the movable ring tries to move by virtue of the force of the spring, as stated above. In addition, when a tip portion of the movable ring is abutted upon a lower knock plate (described later) and the movable ring is approached to the chuck mechanism against the urging force of the spring, the lead is immovable as long as the chuck mechanism holds the lead. Instead, the tip portion of the lead projects from the movable ring in the opposite direction by a degree corresponding to the motion of the movable ring.

By a single lead-feeding operation, drawings can be made until the movable ring projecting from the case to a maximum level retreats into the case to a maximum level. While the movable ring gradually retreats into the case, the lead is worn and shortened. In this case, vertical movement of associated parts is such that while the movable ring is abutted upon the lower knock plate and kept at a constant level, the pencil is gradually lowered by means of a up/down driving mechanism, thus gradually retreating the movable ring into the pencil. Accordingly, the amount of projection of the movable ring from the case is proportional to the amount of wear of the lead.

A reflection-type photosensor may be used to sense the amount of projection of the movable ring from the case. A detection light beam is emitted from an emission portion of the photosensor to a part of the movable ring, and a reflection beam is received by a receiving portion of the photosensor. On the basis of the amount of the received beam, the amount of projection is determined.

However, since the reflectivity of the surface of the movable ring varies depending on its cleanliness, the amount of received light may vary even if the amount of projection is unchanged, and this may result in a malfunction (erroneous determination). The reflectivity of the surface may vary due to not only time-base change of surface condition but also rotation of the movable ring in its circumferential direction. Furthermore, the amount of received light may vary due to presence/absence of ambient disturbance light, and this may also result in a malfunction.

SUMMARY OF THE INVENTION

The object of the present invention is to provide a plotter with a pencil-lead detecting system which can surely determine the lead-remaining/lacking state, regardless to a variation in reflectivity of a movable ring.

According to this invention, there is provided a plotter with a pencil-lead detecting system, comprising: a knock-type pencil including a pencil case, a knock mechanism situated at an upper end portion of the pencil case and containing a plurality of pencil-leads, a chuck mechanism controlled by the knock mechanism to hold and release one of the pencil-leads fed from the knock mechanism, a movable ring situated at a lower end portion of the pencil case such that a part of the movable ring projects from the pencil case, and holding the pencil-lead fed from the chuck mechanism, and a spring for urging the movable ring downward; a pen holder for holding and vertically moving the knock-type pencil; a reflection-type photosensing device for detecting the amount of projection of the movable ring from the pencil case; a preliminary sensor read unit for performing preliminary sensor read for the movable ring by using the photosensing device, with the pencil set in an upper position; a knock unit for effecting a single lead-knocking operation for the pencil after the preliminary sensor read; a determining sensor read device for performing determining sensor read for the movable ring after the lead-knocking operation by using the photosensing device, with the pencil set in the upper position; and a lead-remaining/lacking state determining unit for preparing a determining threshold level on the basis of a sensor value obtained by the preliminary sensor read and discriminating a difference between a sensor value of the determining sensor read and the sensor value of the preliminary sensor read, thereby determining the lead-remaining/lacking state of the pencil.

In this case, there may be further provided an offset value determining unit for determining an offset value for increasing a disturbance light margin prior to the preliminary sensor read, and/or a gain determining unit for determining a gain for increasing an operation range prior to the preliminary sensor read.

In the preliminary sensor read, the light reflected by the movable ring is measured by the sensor before the lead-feeding operation, and a threshold level for use in the determining sensor read is set on the basis of the amount of light received by the sensor. In the determining sensor read, the light reflected by the movable ring after the lead-feeding operation is measured, and the difference between the measured light amount in the determining sensor read and that in the preliminary sensor read is discriminated with reference to the threshold value, thereby determining the lead-remaining/lacking state. Since the threshold level represents the variation in reflectance of the movable ring, a malfunction due to the variation in reflectivity can be prevented.

DETAILED DESCRIPTION OF THE PREFERRED EMBODIMENT

An embodiment of the present invention will now be described with reference to the accompanying drawings.

Figure 1:
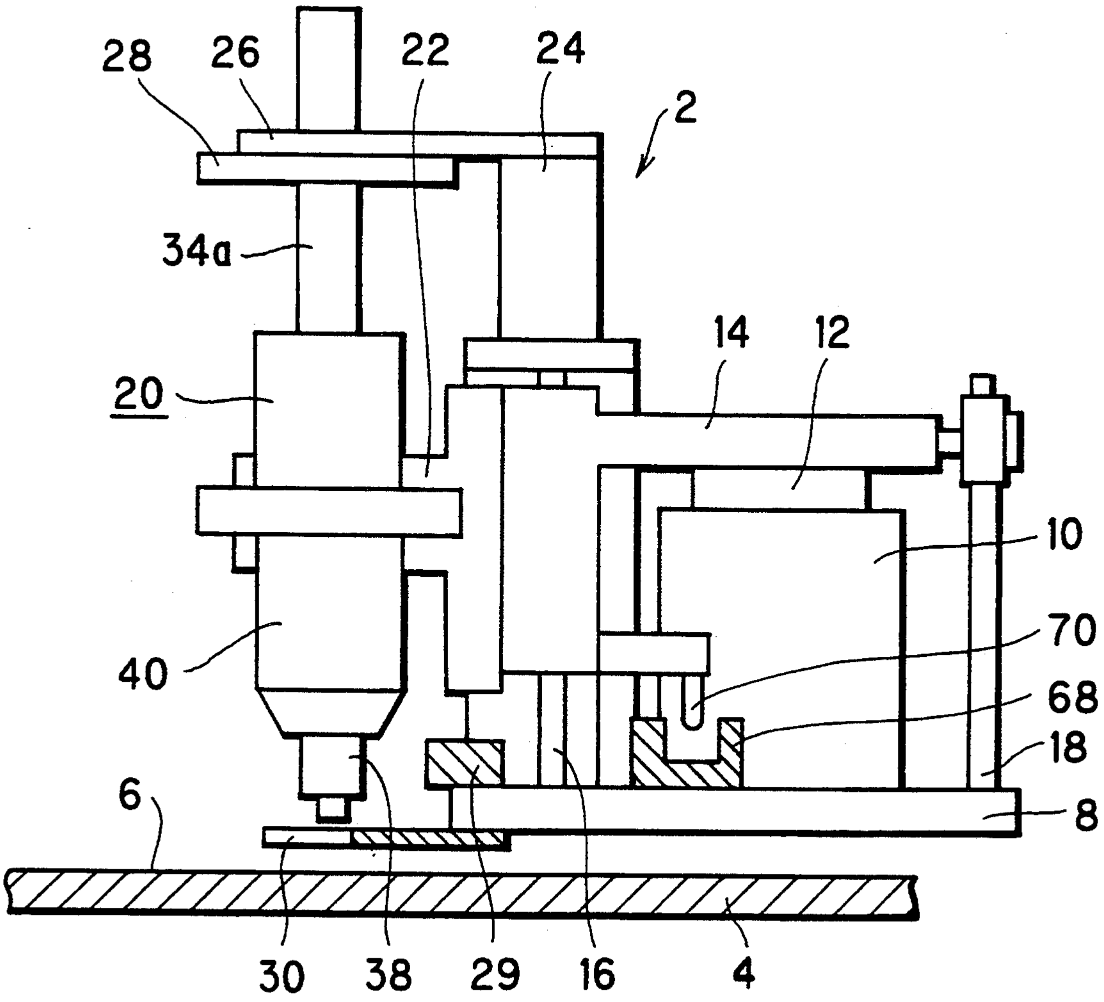
FIG. 1 is a side view of a pen carriage.
Figure 2:
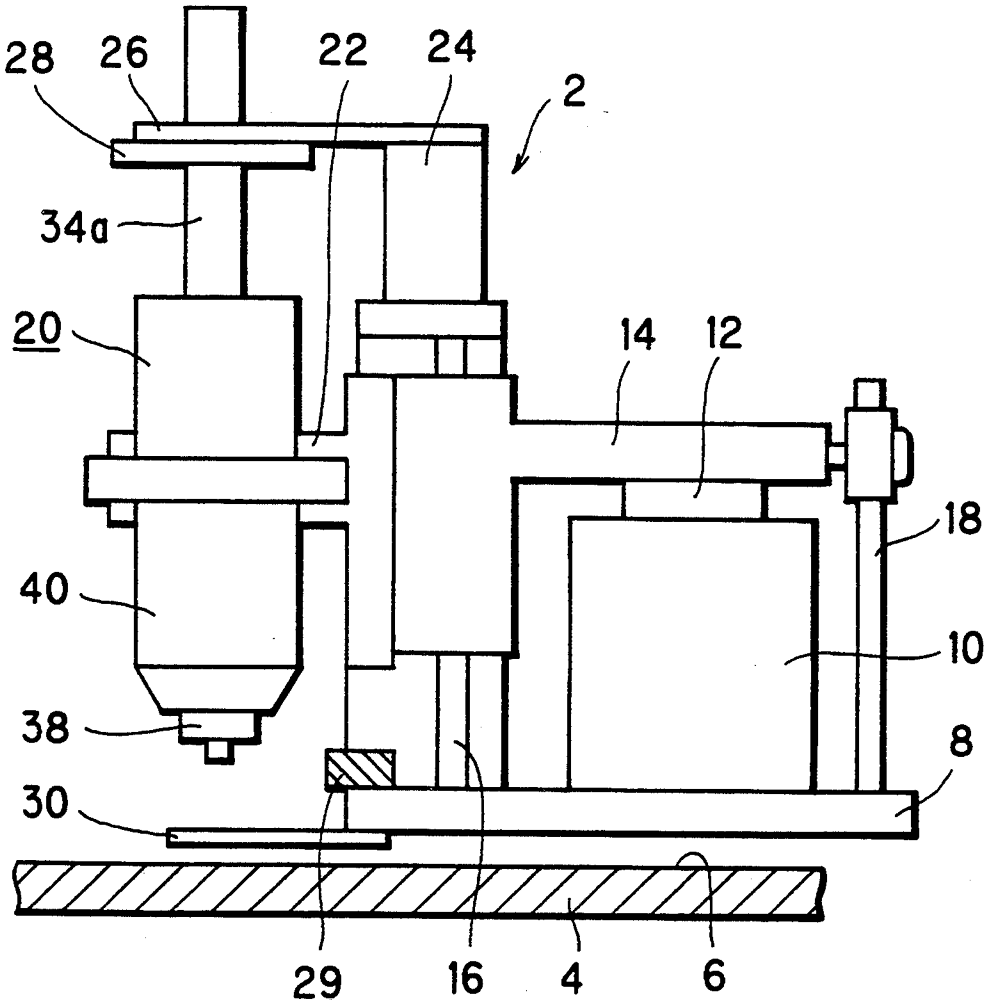
FIG. 2 is a side view of the pen carriage in a different state thereof.

First, a pen carriage in an X-Y plotter according to the embodiment will be described by referring to FIGS. 1 and 2. In these figures, the pen carriage 2 of the X-Y plotter is supported to be movable in X-Y directions (two axial directions) relative to paper 6 on a paper support plane 4. An up/down driving mechanism 10 having a moving coil is fixed on a base 8 of the pen carriage 2. An up/down arm 14 is fixed on an output member 12 of the driving mechanism 10. The up/down arm 14 is supported by guide shafts 16 and 18 so as to be vertically movable.

The up/down arm 14 is provided with a pen holder 22 for removably holding a knock-type pencil 20. An upper knock plate 26 is fixed to a fixing plate 24 standing on the base 8. The upper knock plate 26 is situated above a flange 28 of the pencil 20. A knock tube 34*a* of the pencil 20 is loosely fitted in a U-groove hole 26*a* (see FIG. 4) formed in the upper knock plate 26.

Figure 3:
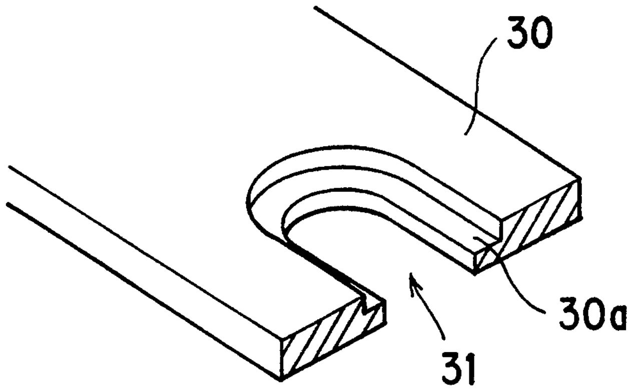
FIG. 3 shows an external appearance of a lower knock plate.

On the other hand, a lower knock plate 30 is fixed on the lower end of the base 8. The lower knock plate 30 can also serve as a guide for a movable ring 38 of the pencil 20. A tip end portion 38*a* (see FIG. 4) of the movable ring 38 is slidably engaged in a groove hole 31 (see FIG. 3) which has its front area opened and is formed in the lower knock plate 30. A lower horizontal face of the movable ring 38 can be abutted on a stepped horizontal face 30*a* formed around the groove hole 31 in the lower knock plate 30.

The base 8 is provided with a photosensor 29 for detecting the movable ring, with the detection surface of the photosensor 29 directed to the pencil 20. The sensor 29 is situated at such a level that it can detect whether the movable ring 38 projects from the tip of a case 40 of the pencil 20 or retreats into the case 40, when the pencil 20 is raised just before the flange 28 of the knock tube 34*a* abuts upon the upper knock plate 26.

A stroke detection photosensor 68 is fixed on the base 8. The photosensor 68 cooperates with a movable plate 70 attached to the up/down arm 14 to convert the vertical movement of the arm 14 to an electric signal and feed the electric signal back to a controller.

The body of the X-Y plotter is provided with a stocker for storing a plurality of knock-type pencils, and pencils are exchanged between the stocker and the pen holder 22 of the pen carriage 2. This part is not shown, and a description thereof is omitted.

Figure 4:
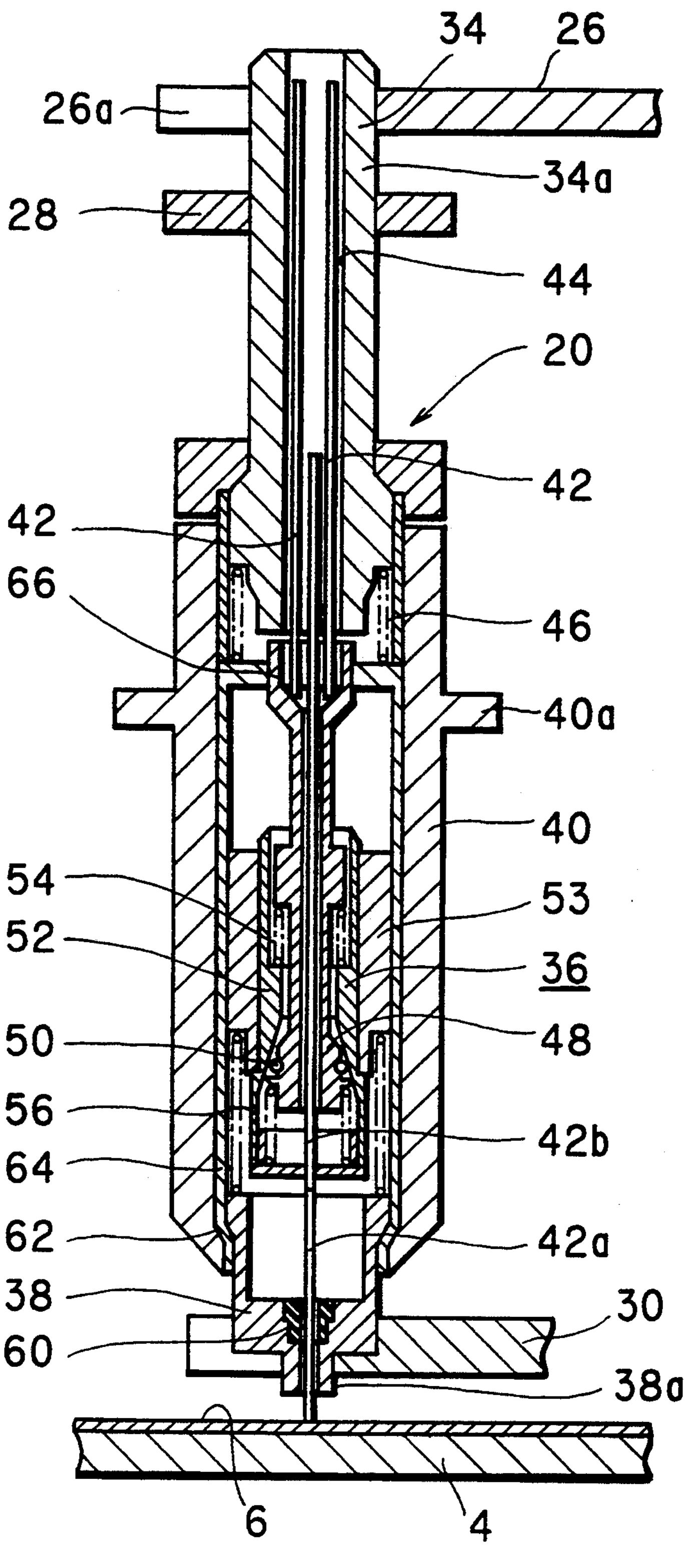
FIG. 4 is a cross-sectional view of a knock-type pencil.

The structure of the knock-type pencil 20 will now be described with reference to FIG. 4. The pencil 20 includes a knock mechanism 34, a chuck mechanism 36, the movable ring 38 and the pencil case 40. The knock mechanism 34 has a knock tube 34*a* with a lead passage 44 for holding leads 42, and also has a knock spring 46.

The chuck mechanism 36 comprises a chuck member 48 with a divided end portion, balls 50 attached to the chuck member 48, a chuck case 52 fixed to an inner case 62 via a tube body 53, and two chuck springs 54 and 56. The chuck member 48 clamps the inside lead 42 by virtue of the resilient force of the chuck springs 54 and 56.

The movable ring 38 is provided at the tip of the pencil 20. The ring 38 has a rubber tube 60 for holding the lead 42 at its center with an appropriate frictional force. The movable ring 38 is supported to be vertically slidable relative to the case 40, and it is urged downwards by a spring 64.

The operation of the pencil 20 will be described. One pencil-lead 42 retained in the lead passage 44 is supplied into the chuck mechanism 36 through a funnel member 66 formed at an upper part of the chuck mechanism 36. Suppose that the previously supplied lead (old lead) is a first lead 42*a* and the subsequently supplied lead (new lead) is a second lead 42*b*.

The knock mechanism 34 is vertically reciprocated once or several times, and the releasing and clamping operations of the chuck member 48 are performed accordingly. Thus, the first lead 42*a* falls by its own weight and is clamped by the chuck member 48 of the chuck mechanism 36. In general, the first lead 42*a* falls until its end portion contacts the upper end of the rubber tube 60 of the movable ring 38. In this state, the movable ring 38 is vertically reciprocated, thereby gradually projecting the first lead 42*a*.

This operation will now be described in greater detail. The chuck mechanism 36 of the pencil 20 is designed such that when the mechanism 36 holds the lead, it has a very strong holding force in a direction in which the lead is projected and in a direction in which the lead is pushed back. Thus, when the movable ring 38 is vertically reciprocated, the first lead 42*a* is immovably held by the chuck member 48. Instead, the movably ring 38 moves relative to the first lead 42*a*.

When the chuck member 48 is released, the movable ring 38 returns to its original position by the force of the spring 64. At this time, the first lead 42*a* is drawn by the frictional force of the rubber tube 60 by a distance corresponding to the vertical stroke of the movable ring 38. When the first lead 42*a* is projected from the tip of the pencil 20 by this operation, drawings can be made.

The operation for plotting will now be described. This operation includes a pen-down step, pen-up step, lead-projecting step, lead-lacking detection step, and lead-supplying step.

When the plotting operation is started, a plotting command is input from a host computer to a plotting controller. Then, the controller controls power supply to the up/down driving mechanism 10 and lowers the up/down arm 14. In this state, the movable ring 38 is projected to a maximum degree from the case 40 by the force of the spring 64, as shown in FIG. 4. When the up/down arm 14 is lowered, the lower face of the movable ring 38 contacts the upper face of the lower knock plate 30, and the tip of the lead 42*a* is put in pressure contact with the paper 6 on the paper support plane 4 by the downward force transmitted from the case 40 ("pen-down" state).

In response to the plotting command, the controller enables the pen carriage 2 to move in X- and Y-directions relative to the paper 6. In accordance with the locus of movement of the pen carriage 2 on the paper 6, drawings can be made by the lead 42*a* on the paper 6. When the lead 42*a* is worn out during plotting, the case 40 lowers in accordance with the degree of wear of the lead 42*a* by the downward force transmitted from the up/down driving mechanism 10. Thus, the writing pressure of the lead 42*a* on the paper 6 is kept constant.

When the case 40 lowers, the movable ring 38 held at a fixed position by the lower knock plate 30 retreats into the case 40 while the spring 64 is compressed. During plotting, the pen-up operation is performed by slightly raising the output member 12 of the up/down driving mechanism 10. When the output member 12 is raised and the case 40 rises slightly from its lower position, the lead 42*a* lifts from the paper 6 accordingly.

When the lead 42*a* is worn out during plotting and the case 40 lowers to its lower limit position, a lower position signal is supplied from the stroke detection photosensor 68 to the controller. The controller determines whether or not the case 40 has lowered to the lower limit position. If it determines that the case 40 is in its lower limit position, the up/down driving mechanism 10 is controlled to raise the case 40 to its upper limit position.

In the state in which the movable ring 38 retreats to a maximum degree into the case 40 (see FIG. 2), the lead 42*a* has a sufficient length and is held by the chuck mechanism 36. When the lead 42*a* is held by the chuck mechanism 36, the movable ring 38 moves along with the upward motion of the case 40 while it keeps its retreat position in the case 40 by virtue of friction between the rubber tube 60 and lead 42*a*. This is the "lead-remaining" state.

In accordance with the upward motion of the case 40, the flange 28 abuts on the upper knock plate 26 and it is pushed down by the plate 26. Then, the chuck mechanism 36 is released. At this time, the movable ring 38 moves and projects from the case 40 to a maximum degree by the force of the spring 64. Simultaneously, the lead 42*a* is fed out from the chuck mechanism 36 by the friction of the rubber tube 60 by a degree corresponding to the stroke of the movable ring 38. This is the "lead-projecting" operation.

A description will now be given of the case where the lead 42*a* has been worn out and shortened and it has been removed from the chuck mechanism 36. In the case where the lead 42*a* has become short and its rear end has been removed from the chuck mechanism 36, when the case 40 rises, the movable ring 38 is projected from the case 40 to a maximum degree by the force of the spring 64, as shown in FIG. 1. This is the "lead-lacking" state.

The operations for feeding a lead and detecting the completion of lead feeding after detection of the lead-lacking state will now be described with reference to FIGS. 5 to 9.

Figure 5:
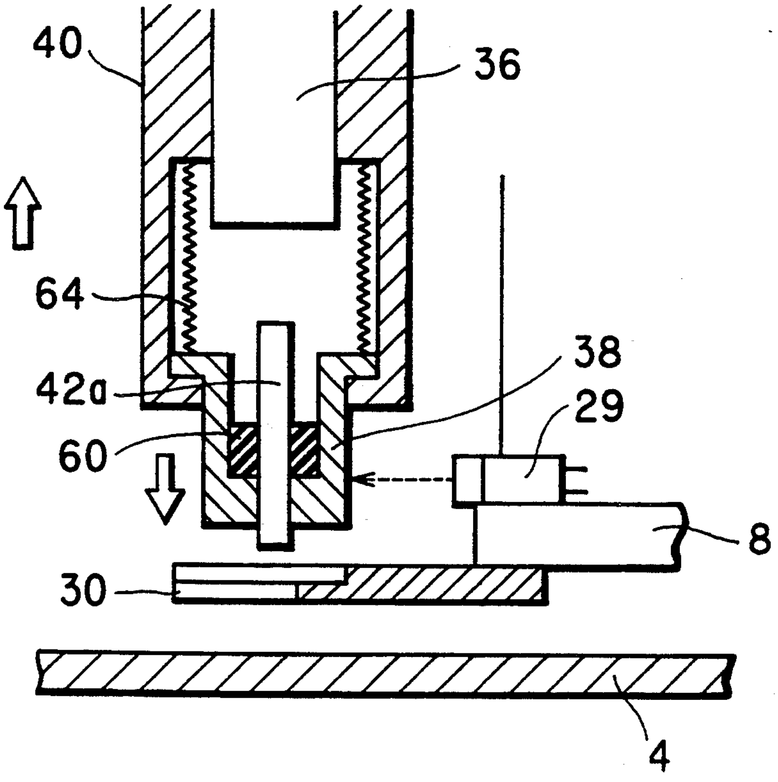
FIG. 5 is a partial cross-sectional view of the pencil in the lead-lacking state thereof.
Figure 6:
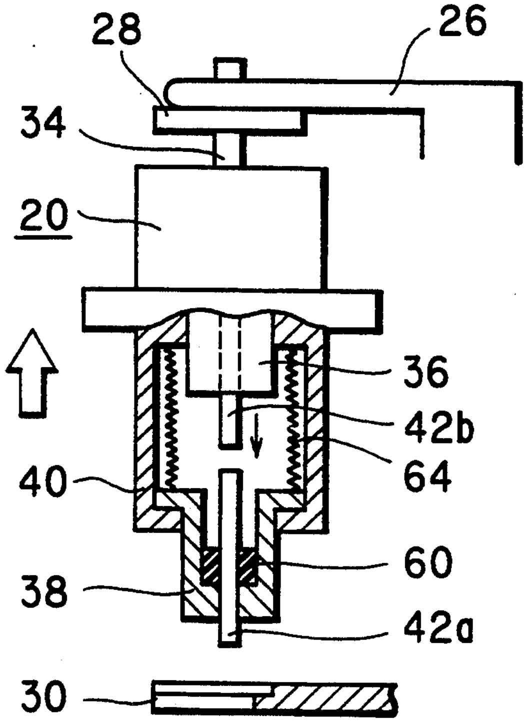
FIG. 6 is a partial cross-sectional view of the pencil at the time an operation for providing a new lead is started.

When the old lead 42*a* retained by the rubber tube 60 of the movable ring 38 has become short, as shown in FIG. 5, the lead feeding operation is started and the case 40 is vertically reciprocated several times. First, as shown in FIG. 6, the case 40 is moved upward and the flange 28 is abutted upon the upper knock plate 26. Consequently, the knock tube 34*a* is pushed down relative to the case 40 and the new lead 42*b* held by the chuck mechanism 36 is released and falls by its own weight. The lower end of the new lead 42*b* contacts the upper end of the old lead 42*a*. When there is no old lead, the lower end of the new lead 42*b* contacts the upper end of the rubber tube 60 of the movable ring 38.

Figure 7:
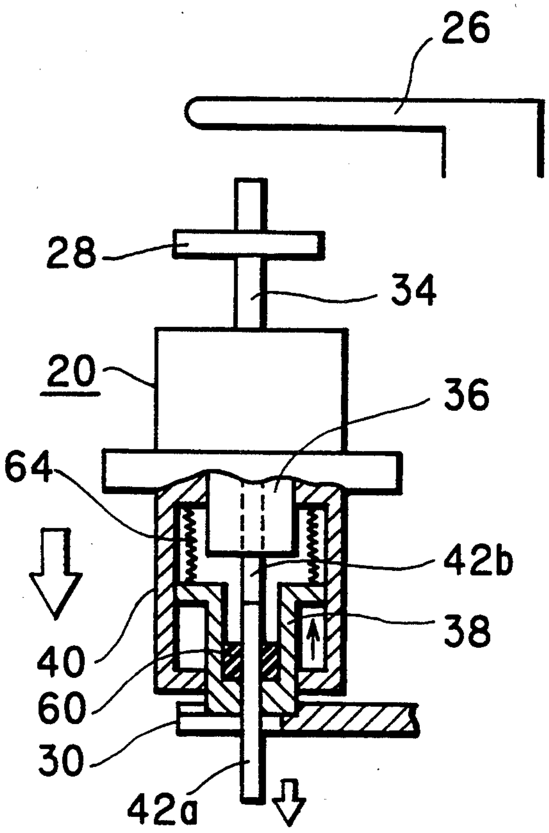
FIG. 7 is a partial cross-sectional view of the pencil at the time the new lead is being provided.

Then, when the case 40 is lowered, as shown in FIG. 7, the movable ring 38 is pushed up relative to the case 40 by the lower knock plate 30. Consequently, the old lead 42*a* held by the movable ring 38, of which upper end contacts the lower end of the new lead 42*b* held by the chuck mechanism 36, is pushed downward by a degree corresponding to the upward stroke of the movable ring 38.

When the case 40 is raised once again, as shown in FIG. 6, the movable ring 38 is released from the pressure applied by the lower knock plate 30. Thus, the movable ring 38 projects from the case 40, while holding the old lead 42*a*, by the force of the spring 64. By this movement, a gap corresponding to the projecting stroke of the movable ring 38 is provided between the old lead 42*a* and the new lead 42*b*.

The case 40 is raised further and the knock tube 34*a* abuts upon the upper knock plate 26. Thus, the chuck mechanism 36 is released and the new lead 42*b* falls until it abuts on the old lead 42*a* by its own weight.

Figure 8:
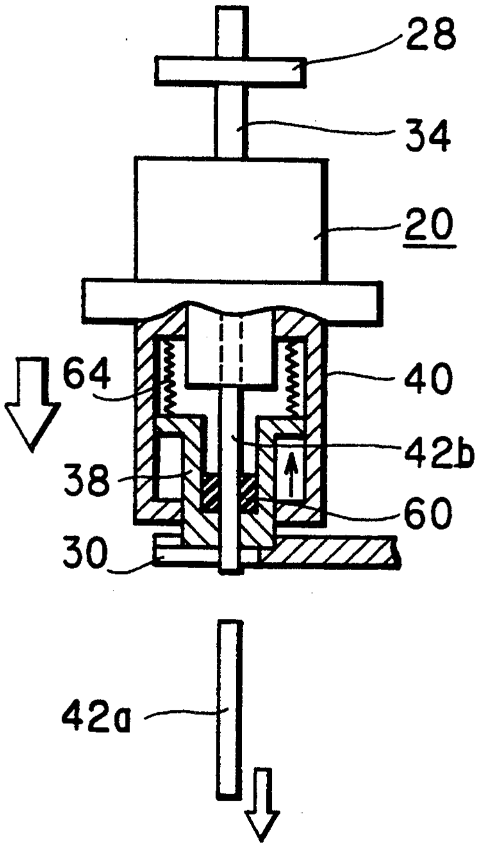
FIG. 8 is a partial cross-sectional view of the pencil at the time the new lead has been provided.
Figure 9:
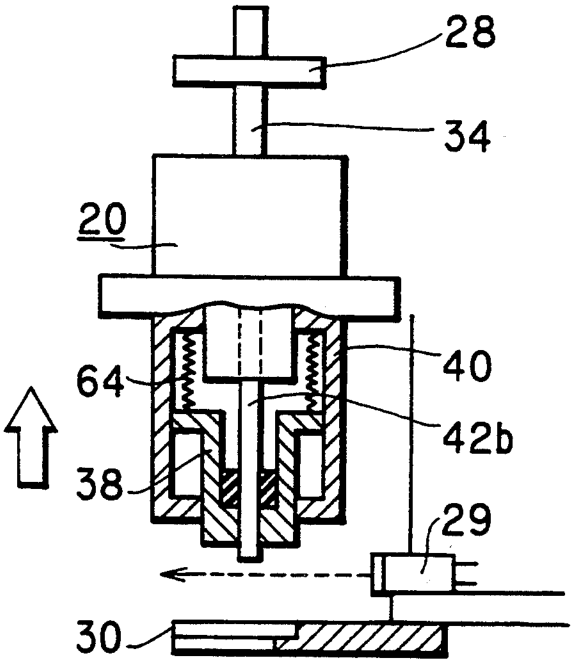
FIG. 9 is a partial cross-sectional view of the pencil at the time the completion of the operation for providing the new lead is detected.

By repeating the above operations, the new lead 42*b* is tightly inserted into the rubber tube 60 of the movable ring 38. The old lead 42*a* pushed out by the new lead 42*b* is removed from the movable ring 38, as shown in FIG. 8, and it falls downward. Once the new lead 42*b* is tightly inserted in the rubber tube 60 of the movable ring 38, the movable ring 38 retains its retreat position in the case 40, even after the case 40 is raised, as shown in FIG. 9, and the movable ring 38 is released from the push-up force applied by the lower knock plate 30. The retreat position of the movable ring 38 is kept until the knock tube 34*a* abuts on the upper knock plate 26 and the chuck mechanism 36 is released. This is the lead-feeding operation.

The controller detects, on the basis of an output from the sensor 29, whether the movable ring 38 projects from the tip of the case 40 by a predetermined degree, before the knock tube 34*a* abuts on the upper knock plate 26. When the movable ring 38 retreats into the case 40 by a predetermined degree, as shown in FIG. 9, the controller recognizes the completion of lead feeding.

Figure 10:
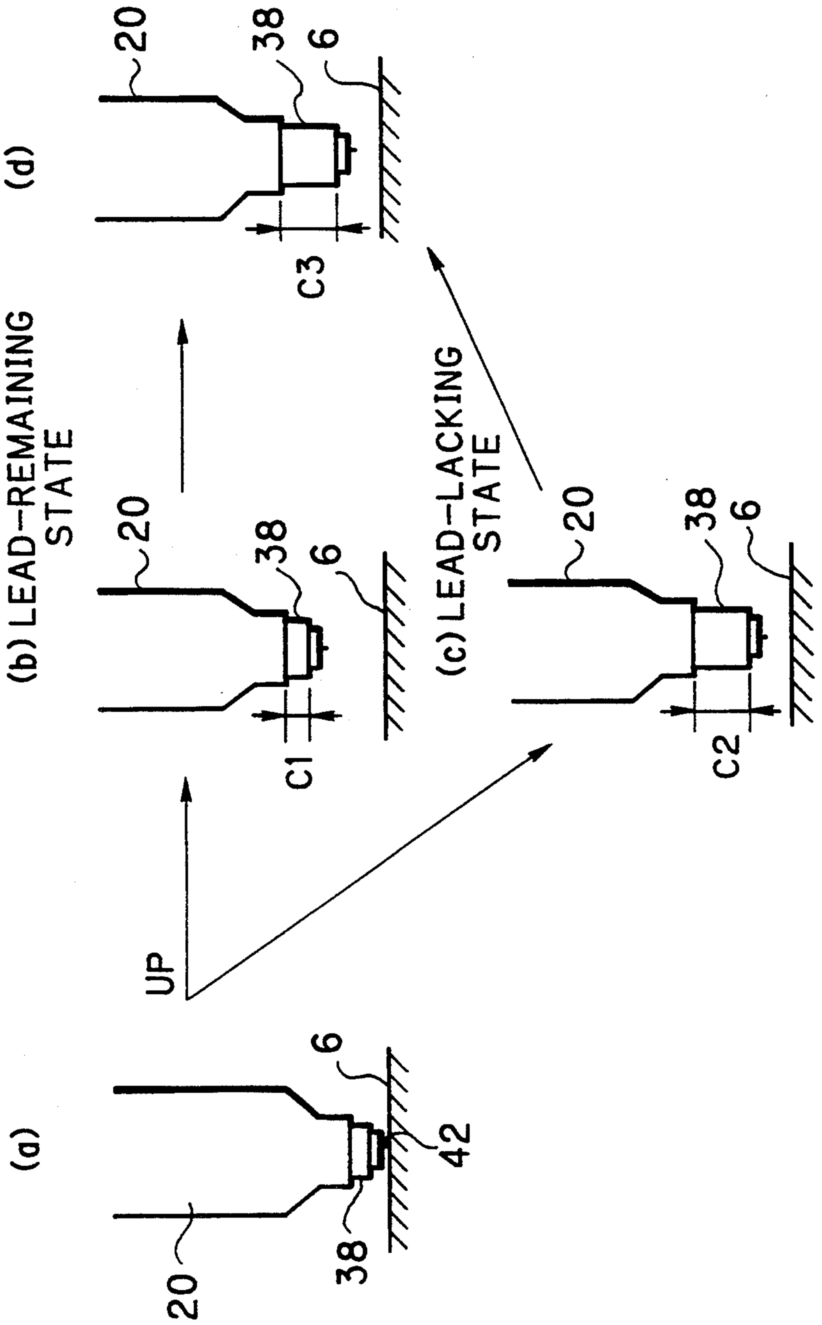
FIGS. 10(*a*)-(*d*) are views for illustrating an operation for determining the lead-remaining/lacking state.

FIG. 10 illustrates a system for emitting detection light from a reflection-type photosensor to the movable ring and determining the degree of projection of the movable ring on the basis of the amount of reflected light received by the photosensor. FIG. 10(*a*) shows the state in which the pencil 20 is lowered to put the lead 42 projected from the movable ring 38 into contact with the paper 6 under a predetermined pressure, so that plotting can be performed. When the pencil 20 is moved upward from this state, the amount C1 of projection of the movable ring 38 is small if the lead is remaining, as shown in FIG. 10(*b*). If the lead is lacking (i.e. the lead is removed from the chuck mechanism 36), the amount C2 of projection of the movable ring 38 is greater than C1, as shown in FIG. 10(*c*). A difference between the amounts C1 and C2 of the projection occurs as a result of a difference in the amounts received lights.

Figure 11:
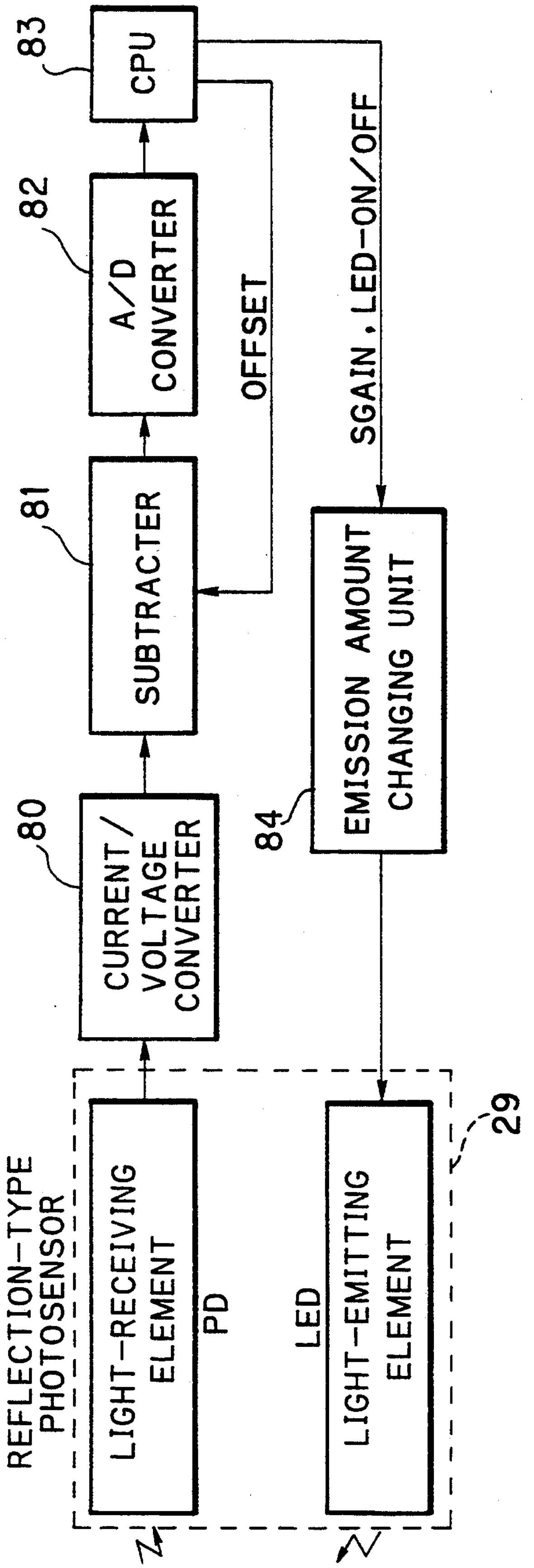
FIG. 11 is a block diagram of a pencil-lead detecting system of the present invention.

FIG. 11 is a block diagram showing a lead-remaining-/lacking state detecting device of the present invention. In FIG. 11, numeral 80 denotes a current/voltage converter, 81 a subtracter, 82 an A/D converter, 83 a CPU, and 84 an emission amount changing unit. The reflection-type photosensor 29 serving as a movable ring detection sensor comprises, e.g. a light-emitting element (light-emitting diode) LED and a light-receiving element (photodiode) PD. Measuring light is radiated from the LED to the movable ring, and the reflected light is received by the PD.

A received-light current output from the PD is converted to a received-light voltage by the current/voltage converter 80. An offset value "OFFSET" is subtracted from the received-light voltage in the subtracter 81, where necessary. An output from the subtracter 81 is converted to a digital value by the A/D converter 82, and the digital value is input to the CPU 83. The CPU 83 has a function of determining an input digital value with reference to a predetermined threshold value, thereby determining the lead-remaining/lacking state, as well as functions of turning on/off the "OFFSET" value, changing a gain (ON/OFF of "SGAIN"), and turning on/off the LED.

The "OFFSET" is turned on in order to increase disturbance light margin, when disturbance light greater than a predetermined value has been detected. The emission amount of LED, i.e. the gain, can be changed by turning on/off "SGAIN", thereby increasing the measurement range.

Figure 13:
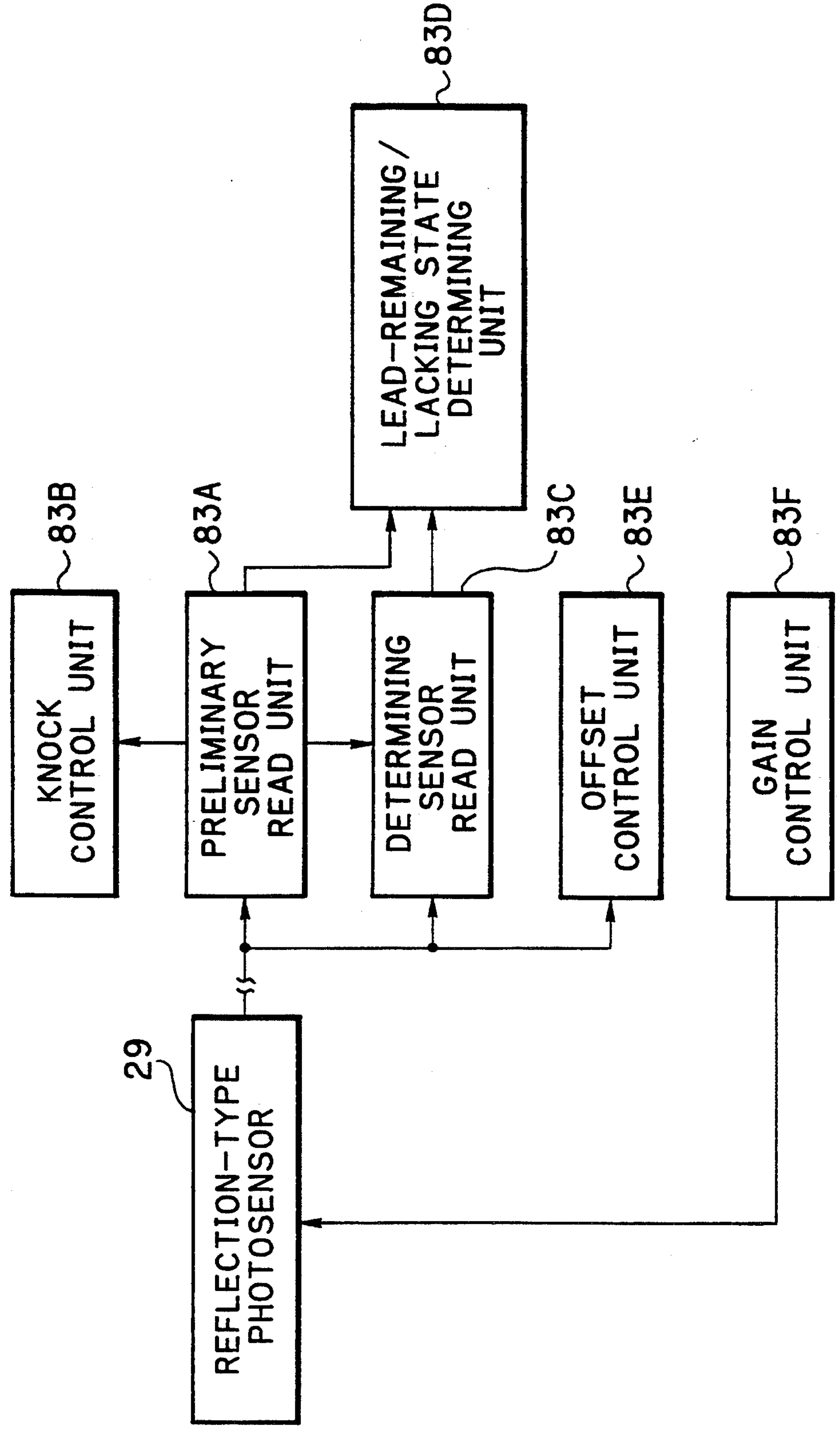
FIG. 13 is a block diagram showing an important portion of the present invention.

FIG. 13 is a block diagram showing an important structure of the present invention, which is principally related to the software structure within the CPU 83 shown in FIG. 11. Specifically, the CPU 83 comprises preliminary sensor read unit 83A for effecting preliminary sensor read on the movable ring 38, with the pencil set in the upper position, by using a sensor 29; a knock control unit 83B for effecting a single lead-knocking operation of the pencil, subsequently to the preliminary sensor read; determining sensor read unit 83 C for effecting determining sensor read on the movable ring by using the sensor, with the pencil set in the upper position subsequently to the lead-knocking operation; lead-remaining/lacking state determining unit 83D for preparing a determining threshold level on the basis of the sensor value obtained by the preliminary sensor read unit 83A, and finding a difference between the sensor value of the determining sensor read unit 83C and the sensor value of the preliminary sensor read unit 83A, thereby determining the lead-remaining/lacking state of the pencil; offset control unit 83E for determining an offset value for increasing the disturbance light margin, prior to the preliminary sensor read; and gain control means 83F for determining a gain for increasing the operation range, prior to the preliminary sensor read.

Figure 12:
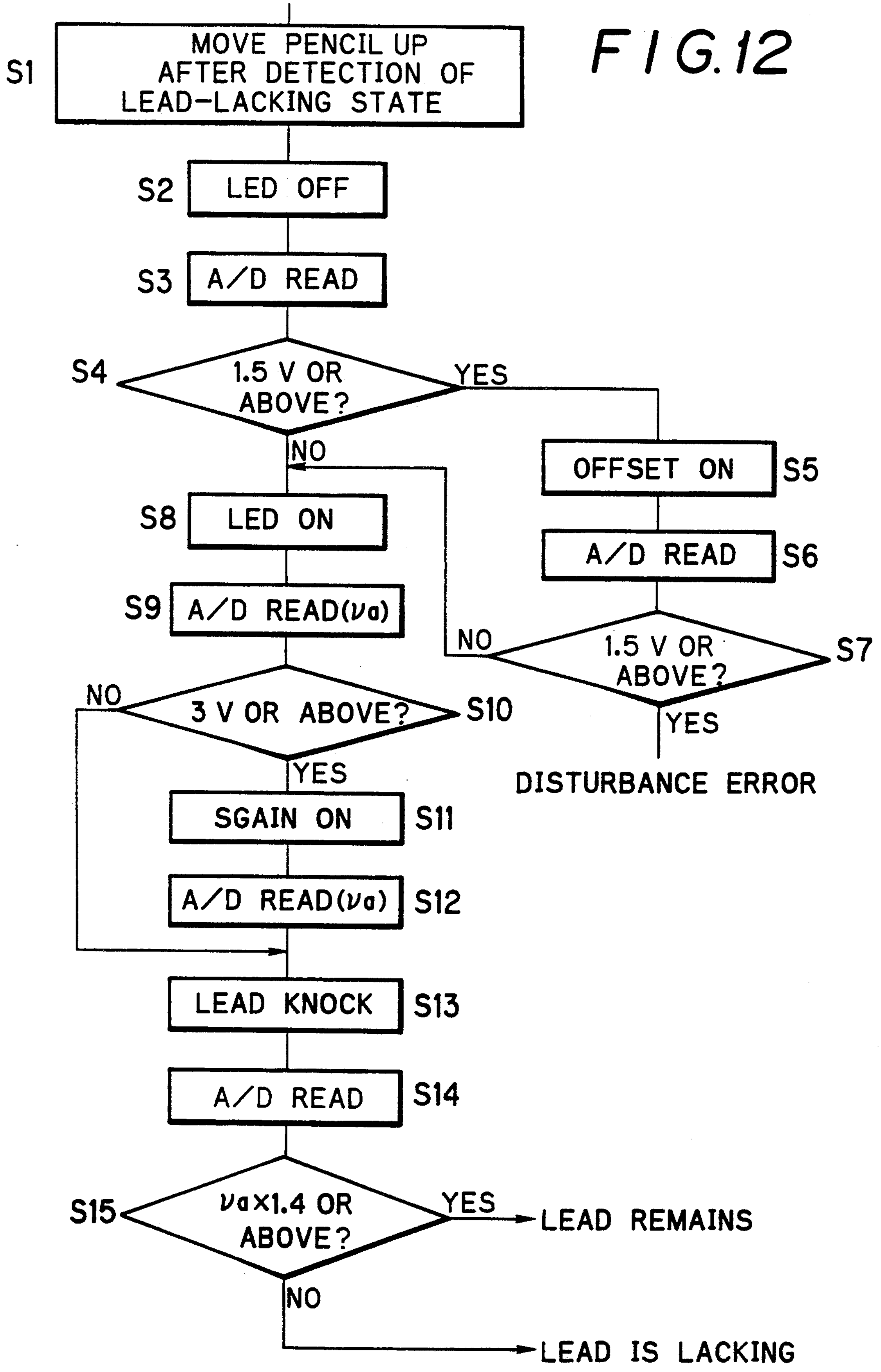
FIG. 12 is a flow chart showing the operation of the present invention.

The operation of the present invention will now be described with reference to the flow chart of FIG. 12.

In step S1, the pencil 20 is moved upward, as shown in FIG. 10(*b*) and FIG. 10(*c*). While the LED is kept in the off state, the output from the A/D converter 82 (the input range is 0 to 5 V in this case) is read (steps S2 and S3) and it is determined whether or not the read value is 1.5 V or above (step S4). The A/D read in step S3 is directed to measurement of disturbance light. If disturbance light of 1.5 V or above is detected, "OFFSET" is turned on in step S5. Thus, "OFFSET" is subtracted from the received-light voltage in the subtracter 81.

In step S6, A/D read is effected to confirm the effect of the "OFFSET". If the value of 1.5 V or above is detected, processing for a disturbance light error is performed. If the read value is lowered to less than 1.5 V by using the "OFFSET", the elimination of influence due to disturbance light is confirmed, and the control routine advances from step S7 to step S8. Such countermeasure to disturbance light can reduce the cost of the sensor, compared to a method in which pulse modulation for emitting light is effected in the LED, and the size of the sensor can be reduced.

On the other hand, when the read value is less than 1.5 V in step S4, there is no undesirable disturbance light. Thus, the control routine goes to step S8, with the "OFFSET" kept in the off state.

In step S8 the LED is turned on, and in step S9 preliminary A/D read (preliminary sensor read) is performed and an A/D value Va obtained at this time is stored in a memory. When a received light amount of 3 V or above is detected by the A/D read, the gain is too high (saturated). Thus, the "SGAIN" is turned on in step S11. Consequently, the light emission amount of the LED is lowered by a predetermined degree (i.e. the gain decreases), and so the preliminary A/D read is effected once again in step S12. On the basis of the A/D value Va obtained at this time, the value Va in step S9 is updated.

On the other hand, if the read value is less than 3 V in step S10, the gain is not so high and the control routine goes to step S13. In step S13, a single lead knocking operation is performed in the state shown in FIGS. 10(*b*) or 10(*c*). After the lead knocking, determining A/D read (determining sensor read) is performed in step S14 with the pencil kept in the raised position. A difference between the read value obtained in step S14 and Va obtained in step S9 or S12 is calculated in step 15. Furthermore, in step S15, a threshold level of Va×1.4 is used and it is compared with the difference. The value 1.4 is an experimentally found constant. On the basis of this constant, the lead-remaining/lacking state can be determined, independently of the surface condition of the movable ring. Specifically, if the difference is Va×1.4 or above, the lead remains; if the difference is less than Va×1.4, the lead is lacking.

The theory of determination in step S15 is based on the following reason. When the movable ring 38 in the state in which the pencil is in the raised position is observed before and after the lead knocking in step S13, the movable ring 38 moves from the state of FIG. 10(*b*) to the state of FIG. 10(D) if the lead remains (C3>C1). Thus, the difference in A/D value in the preliminary A/D read and determining sensor read is large. By contrast, if the lead is lacking, the movable ring 38 does not substantially move, as shown in FIGS. 10(*c*) and 10(*d*). Thus, the difference in A/D value in the preliminary A/D read and determining sensor read is small (C3=C2). Therefore, the lead-remaining/lacking state can be determined by the theory of step S15.

As has been described above, according to the method of the present invention, the reflected-light amount, associated with the lead-remaining/lacking state, is preliminarily read just before the lead-projecting operation. Thus, there is no need to consider a variation in reflected-light amount due to rotation of the movable ring. In addition, in the step of discriminating the output of the determining sensor read, the threshold level obtained by multiplying the output of the preliminary sensor read by a predetermined coefficient is used. Thus, there is little influence due to time-base change of the LED or precision of electric circuits. Furthermore, even if the range of a variation in reflected-light amount due to contamination or surface treatment on the movable ring increases, the result of determination is not adversely affected.

Moreover, since the offset value is set to eliminate the influence of disturbance light, the disturbance light margin can be increased. Since the gain is changed in accordance with the absolute value of the received-light amount, a wide operation range is obtained.

The present invention can be worked in various modes other than the above-described embodiment. For example, in the pencil-read detecting system of the present invention, the threshold level prepared based on the result of the preliminary sensor read may be directly compared with the output of the determining sensor read.

According to the pencil-lead detecting system, it is also possible to compare a difference between the output of the preliminary sensor read and that of the determining sensor read with a predetermined threshold level.

What is claimed is:

1. A plotter with a pencil-lead detecting system, comprising:

a knock-type pencil including a pencil case, a knock mechanism situated at an upper end portion of the pencil case and containing a plurality of pencil-leads, a chuck mechanism controlled by the knock mechanism to hold and release one of the pencil-leads fed from the knock mechanism, a movable ring situated at a lower end portion of the pencil case such that a part of the movable ring projects from the pencil case, and holding the pencil-lead fed from the chuck mechanism, and a spring for urging the movable ring downward;

a pen holder means for holding and vertically moving the knock-type pencil;

reflection-type photosensing means for detecting an amount of projection of the movable ring from the pencil case;

preliminary sensor read means for performing a first read operation of the movable ring by reading an output from the photosensing means, with the pencil set in an elevated position relative to the photosensing means;

knock means for effecting a single lead-knocking operation for the pencil after the first read operation;

determining sensor read means for performing a second read operation of the movable ring by reading the output from the photosensing means after the lead-knocking operation, with the pencil set in the elevated position;

threshold level preparing means for preparing a determining threshold level based on a first sensor value obtained by the first read operation; and lead-remaining/lacking state determining means for determining a lead-remaining state or a lead-lacking state of the pencil by discriminating a difference between a second sensor value obtained by the second read operation and the first sensor value obtained by the first read operation, thereby determining the lead-remaining or lead-lacking state of the pencil.

2. A plotter according to claim 1, further comprising:

offset value determining means for determining an offset value for increasing a disturbance light margin prior to the first read operation.

3. A plotter according to claim 1, further comprising:

gain determining means for determining a gain for increasing an operation range prior to the first read operation.

4. A plotter according to claim 2, further comprising:

gain determining means for determining a gain for increasing an operation range prior to the first read operation.

5. A plotter with a pencil-lead detecting system, comprising:

a knock-type pencil including a pencil case, a knock mechanism situated at an upper end portion of the pencil case and containing a plurality of pencil-leads, a chuck mechanism controlled by the knock mechanism to hold and release one of the pencil-leads fed from the knock mechanism, a movable ring situated at a lower end portion of the pencil case such that a part of the movable ring projects from the pencil case, and holding the pencil-lead fed from the chuck mechanism, and a spring for urging the movable ring downward;

a pen holder means for holding and vertically moving the knock-type pencil;

reflection-type photosensing means for detecting an amount of projection of the movable ring from the pencil case;

determining sensor read means for performing a second read operation to determine lead-remaining or lead-lacking state of the pencil by reading an output from the photosensing means; and preliminary sensor read means for performing a first read operation to set a threshold level for determining the lead-remaining or lead-lacking state by reading the output from the photosensing means, prior to the second read operation.

6. A plotter according to claim 5, further comprising:

offset value determining means for determining an offset value for increasing a disturbance light margin prior to the first read operation.

7. A plotter according to claim 5, further comprising:

gain determining means for determining a gain for increasing an operation range prior to the first read operation.

8. A plotter according to claim 6, further comprising:

gain determining means for determining a gain for increasing an operation range prior to the first read operation.

9. A plotter for plotting on a paper with a pencil-lead detecting system, comprising:

a knock-type pencil including a pencil case, a knock mechanism situated at an upper end portion of the pencil case and containing a plurality of pencil-leads, a chuck mechanism controlled by the knock mechanism to hold and release one of the pencil-leads fed from the knock mechanism, a movable ring situated at a lower end portion of the pencil case such that a part of the movable ring projects from the pencil case, and holding the pencil-lead fed from the chuck mechanism, and a spring for urging the movable ring downward;

a pen holder means for holding and vertically moving the knock-type pencil;

reflection-type photosensing means for detecting an amount of projection of the movable ring from the pencil case;

preliminary sensor read means for performing a first read operation of the movable ring by reading an output from the photosensing means, with the pencil set in an elevated position relative to the paper;

knock means for effecting a single lead-knocking operation for the pencil after the first read operation;

determining sensor read means for performing a second read operation of the movable ring by reading the output from the photosensing means after the lead-knocking operation, with the pencil set in the elevated position; and lead-remaining/lacking state determining means for discriminating a difference between a second sensor value obtained by the second read operation and a first sensor value obtained by the first read operation with reference to a predetermined threshold level, thereby determining the lead-remaining or lead-lacking state of the pencil.

10. A plotter according to claim 9, further comprising:

offset value determining means for determining an offset value for increasing a disturbance light margin prior to the first read operation.

11. A plotter according to claim 9, further comprising:

gain determining means for determining a gain for increasing an operation range prior to the first read operation.

12. A plotter according to claim 10, further comprising:

gain determining means for determining a gain for increasing an operation range prior to the first read operation.

* * * * *